(12) United States Patent
Terasawa

(10) Patent No.: US 8,350,951 B2
(45) Date of Patent: Jan. 8, 2013

(54) IMAGE SENSING APPARATUS AND IMAGE DATA CORRECTION METHOD

(75) Inventor: Ken Terasawa, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 192 days.

(21) Appl. No.: 12/881,607

(22) Filed: Sep. 14, 2010

(65) Prior Publication Data

US 2011/0074984 A1    Mar. 31, 2011

(30) Foreign Application Priority Data

Sep. 25, 2009  (JP) .................................. 2009-221443

(51) Int. Cl.
*H04N 5/225*  (2006.01)
(52) U.S. Cl. ......... 348/335; 348/340; 348/241; 382/274
(58) Field of Classification Search .................. 348/335, 348/340, 241, 231.3, 231.6; 382/274
See application file for complete search history.

(56) References Cited

U.S. PATENT DOCUMENTS

| 7,460,728 | B2 | 12/2008 | Kawanishi et al. | |
| 2004/0212715 | A1* | 10/2004 | Togino | ........................... 348/335 |
| 2005/0275904 | A1 | 12/2005 | Kido et al. | |
| 2006/0087707 | A1 | 4/2006 | Akaho | |
| 2008/0273812 | A1* | 11/2008 | Fujita et al. | .................... 382/274 |
| 2009/0067744 | A1 | 3/2009 | Kawanishi et al. | |
| 2009/0141148 | A1* | 6/2009 | Imamura | ....................... 348/241 |
| 2009/0219419 | A1 | 9/2009 | Kawasaka | |

FOREIGN PATENT DOCUMENTS

| JP | 2005-341033 A | 12/2005 |
| JP | 3824237 B | 9/2006 |
| JP | 2007-134903 A | 5/2007 |
| JP | 3912404 B | 5/2007 |

\* cited by examiner

*Primary Examiner* — Tuan Ho
(74) *Attorney, Agent, or Firm* — Cowan, Liebowitz & Latman, P.C.

(57) ABSTRACT

In an image sensing apparatus, an image sensing unit generates image data formed via an optical member, a storage unit stores correction information for correcting deterioration of image quality of the image data, a reading unit reads correction information corresponding to a plurality of setting values close to a parameter used to control the optical member from the correction information stored in the storage unit, a conversion unit converts a pixel position of the image data to polar coordinates, a generation unit generates correction information by interpolating the read correction information, and a correction unit corrects the image data at the pixel position at the polar coordinates using the correction information. The storage unit stores correction information corresponding to more polar angles in a range having a greater degree of change in the deterioration of image quality in an angular direction centered on the optical axis of the optical member.

10 Claims, 15 Drawing Sheets

| 1 | 2 | 3 | 4 |
|---|---|---|---|
| 5 | 6 | 7 | 8 |
| 9 | 10 | 11 | 12 |

IMAGE SENSING APPARATUS AND IMAGE DATA CORRECTION METHOD

BACKGROUND OF THE INVENTION

1. Field of the Invention

The present invention relates to an image sensing apparatus and an image data correction method, and more particularly to a technique for correcting deterioration of image quality due to optical factors based on optical information.

2. Description of the Related Art

Along with the recent trend toward digital video cameras and digital cameras with an increased number of pixels, high quality images having higher resolution are becoming available. On the other hand, deterioration of images due to pixel size reduction, and deterioration of image quality that is principally caused by the optical system, such as reduction in the quantity of light in the periphery of an image circle, magnification chromatic aberrations and distortion aberrations, due to factors such as difficulty in designing small lenses, are becoming more noticeable.

Deterioration of image quality due to optical factors as described above is considered to theoretically have point symmetrical phenomenal characteristics that spread radially from the center of the optical axis. However, the actual images are affected by the characteristics of a lens that is constituted by a plurality of lens groups, the shape of optical members, such as a diaphragm mechanism, as well as the physical structure of sensors, and thus the deterioration of image quality does not always have point symmetrical phenomenal characteristics.

To address such deterioration of image quality having point asymmetrical phenomenal characteristics, conventionally, correction techniques using parameter information (hereinafter referred to as "optical parameters") of the optical system, such as focal length, aperture and focus position, have been proposed by, for example, Japanese Patent Nos. 3824237 and 3912404, and Japanese Patent Laid-Open Nos. 2005-341033 and 2007-134903.

When focal length, aperture and focus position constantly vary during image sensing, particularly in the case of a video camera, deterioration of image quality due to optical factors fluctuates successively depending on changes in the optical parameters. In addition, it is also necessary to give consideration to the fact that the memory capacity required to store correction characteristics data for correcting the above-described point asymmetrical deterioration of image quality, and resources such as the processing time of correction characteristics data are limited and few in the case of image sensing using a camera or a video camera.

In order to cope with such a situation, when generating correction characteristics data, it is necessary to perform appropriate control operations according to the state of optical characteristics and the state of image sensing while taking into consideration the point asymmetry of image quality deterioration.

According to Japanese Patent No. 3824237, the mixing ratio of optical correction values is determined according to optical parameters, and shading correction is performed according to the pixel distance obtained by correcting the distance from a pixel of interest to the center of the screen with distance gain functions in the vertical and horizontal directions. However, this technique only similarly changes basic correction characteristics using the distance gain functions. Accordingly, for optical characteristics having complex point asymmetry, it is necessary to have complex distance gain functions, and appropriate correction effects cannot be obtained since this technique cannot cope with shape changes that are dissimilar. Furthermore, approximating correction characteristics for changes in optical parameters and image height position with a simple model does not actually achieve an appropriate correction process.

According to Japanese Patent No. 3912404, the relative positions of the center of the optical axis and the center of the image sensor caused by image stabilization process are detected, and the phase of shading correction information stored discretely in a radial direction from the center of the optical axis is switched. However, in this example, the discretely disposed correction information is used without being processed, and thus for optical characteristics having complex point asymmetry, there is no way but to simply increase the density of the correction information.

According to Japanese Patent Laid-Open No. 2005-341033, in order to cope with the asymmetry of shading caused by the sensor structure, correction information stored in the x axis and y axis directions is made asymmetric, and the correction coefficient at the position of a pixel of interest is calculated. However, in this example, the asymmetry of the entire screen is expressed by synthesizing line-symmetrical phenomenal characteristics so that they can be expressed by a specific function, and thus this technique cannot cope with optical characteristics that change in an angular direction with respect to the center of the optical axis.

According to Japanese Patent Laid-Open No. 2007-134903, in order to cope with the asymmetry of shading caused by a distortion in the optical system, correction information is converted using an actual measured shading amount, and the correction coefficient at the position of a pixel of interest is calculated. However, this example requires actually measuring point asymmetrical characteristics and storing the information. If actual measurement is performed, there is no point in having correction information in the first place. In addition, it is realistically impossible to perform the same process in the state of actual image sensing in which the optical parameters successively change.

SUMMARY OF THE INVENTION

The present invention has been made in consideration of the above situation, and the present invention makes it possible to quickly correct deterioration of image quality due to optical factors that has complex point asymmetry without enlarging the configuration of the apparatus.

According to the present invention, provided is an image sensing apparatus comprising: a control unit that controls an optical member by using a parameter; an image sensing unit that generates image data from an object image formed via the optical member; a storage unit that stores, with respect to a plurality of setting values assumable by the parameter for controlling the optical member, correction information for correcting deterioration of image quality of image data that is caused by characteristics of the optical member and that is point asymmetrical with respect to an optical axis of the optical member, the correction information corresponding to a plurality of image heights at a plurality of polar angles in a polar coordinate system centered on the optical axis of the optical member; a reading unit that, when the control unit controls the optical member by using the parameter, reads correction information corresponding to a plurality of setting values that are close to a setting value of the parameter used by the control unit from the correction information stored in the storage unit; a conversion unit that converts a pixel position of the image data generated by the image sensing unit to polar coordinates centered on the optical axis of the optical member; a generation unit that generates correction information that corresponds to the setting value of the parameter used by the control unit and the polar coordinates converted by the conversion unit by interpolating the correction information read by the reading unit; and a correction unit that corrects the image data at the pixel position at the polar coordinates by using the correction information generated by the generation unit, wherein the storage unit stores correction information corresponding to more polar angles in a range having a greater degree of change in the deterioration of image quality in an angular direction centered on the optical axis of the optical member.

According to the present invention, provided is an image sensing apparatus comprising: a control unit that controls an optical member by using a parameter; an image sensing unit that generates image data from an object image formed via the optical member; a storage unit that stores, with respect to a plurality of setting values assumable by the parameter for controlling the optical member, correction information for correcting deterioration of image quality of image data that is caused by characteristics of the optical member and that is point asymmetrical with respect to an optical axis of the optical member, the correction information corresponding to a plurality of image heights at a plurality of polar angles in a polar coordinate system centered on the optical axis of the optical member; a reading unit that, when the control unit controls the optical member by using the parameter, reads correction information corresponding to a plurality of setting values that are close to a setting value of the parameter used by the control unit from the correction information stored in the storage unit; a conversion unit that converts a pixel position of the image data generated by the image sensing unit to polar coordinates centered on the optical axis of the optical member; a generation unit that generates correction information that corresponds to the setting value of the parameter used by the control unit and the polar coordinates converted by the conversion unit by interpolating the correction information read by the reading unit; a correction unit that corrects the image data at the pixel position at the polar coordinates by using the correction information generated by the generation unit; and a feature detection unit that detects a feature amount for each region of the image data generated by the image sensing unit, wherein the reading unit reads more correction information with respect to a range having a larger feature amount detected by the feature detection unit from among the correction information stored in the storage unit.

Further, according to the present invention, provided is an image data correction method of an image sensing apparatus, the image sensing apparatus including a control unit that controls an optical member by using a parameter, an image sensing unit that generates image data from an object image formed via the optical member, and a storage unit that stores, with respect to a plurality of setting values assumable by the parameter for controlling the optical member, correction information for correcting deterioration of image quality of image data that is caused by characteristics of the optical member and that is point asymmetrical with respect to an optical axis of the optical member, the correction information corresponding to a plurality of image heights at a plurality of polar angles in a polar coordinate system centered on the optical axis of the optical member, the method comprising the steps of: when the control unit controls the optical member by using the parameter, reading correction information corresponding to a plurality of setting values that are close to a setting value of the parameter used by the control unit from the correction information stored in the storage unit; converting a pixel position of the image data generated by the image sensing unit to polar coordinates centered on the optical axis of the optical member; generating correction information that corresponds to the setting value of the parameter used by the control unit and the polar coordinates converted in the converting step by interpolating the correction information read in the reading step; and correcting the image data at the pixel position at the polar coordinates by using the correction information generated in the generation step, wherein the storage unit stores correction information corresponding to more polar angles in a range having a greater degree of change in the deterioration of image quality in an angular direction centered on the optical axis of the optical member.

Furthermore, according to the present invention, provided is an image data correction method of an image sensing apparatus, the image sensing apparatus including a control unit that controls an optical member by using a parameter, an image sensing unit that generates image data from an object image formed via the optical member, and a storage unit that stores, with respect to a plurality of setting values assumable by the parameter for controlling the optical member, correction information for correcting deterioration of image quality of image data that is caused by characteristics of the optical member and that is point asymmetrical with respect to an optical axis of the optical member, the correction information corresponding to a plurality of image heights at a plurality of polar angles in a polar coordinate system centered on the optical axis of the optical member, the method comprising the steps of: when the control unit controls the optical member by using the parameter, reading correction information corresponding to a plurality of setting values that are close to a setting value of the parameter used by the control unit from the correction information stored in the storage unit; converting a pixel position of the image data generated by the image sensing unit to polar coordinates centered on the optical axis of the optical member; generating correction information that corresponds to the setting value of the parameter used by the control unit and the polar coordinates converted in the converting step by interpolating the correction information read in the reading step; correcting the image data at the pixel position at the polar coordinates by using the correction information generated in the generation step; and detecting a feature amount for each region of the image data generated by the image sensing unit, wherein the reading step comprises reading more correction information with respect to a range having a larger feature amount detected in the feature detection step from among the correction information stored in the storage unit.

Further features of the present invention will become apparent from the following description of exemplary embodiments with reference to the attached drawings.

DESCRIPTION OF THE EMBODIMENTS

Preferred embodiments of the present invention will be described in detail in accordance with the accompanying drawings.

Embodiment 1

Figure 1:
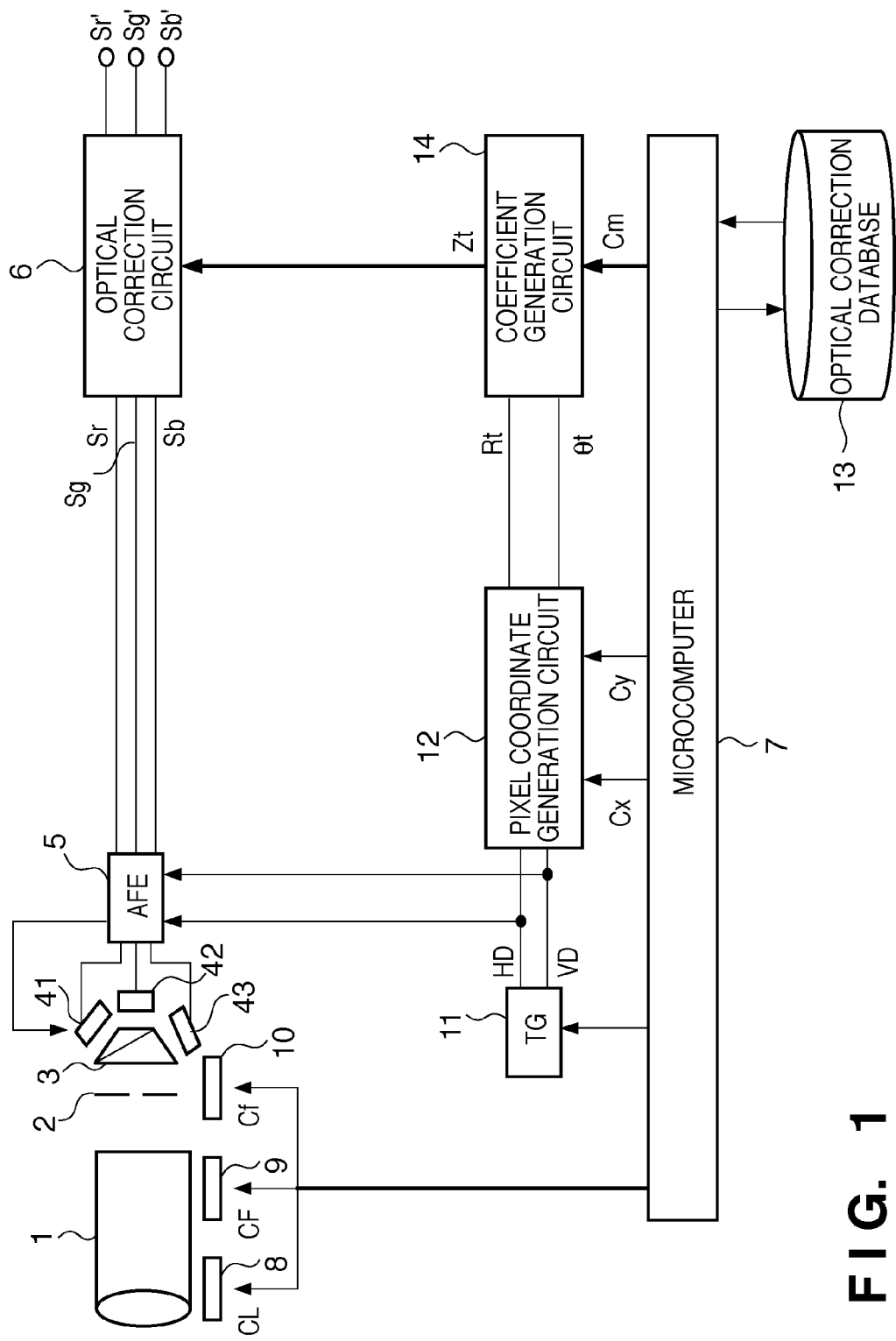
FIG. 1 is a block diagram showing a schematic configuration of an image sensing apparatus according to Embodiment 1.

FIG. 1 is a block diagram showing a schematic configuration of an image sensing apparatus according to Embodiment 1. In FIG. 1, reference numeral 1 denotes a lens unit that includes a zoom lens and a focus lens, and 2 denotes a diaphragm. In the case where the image sensing apparatus is a video camera, an optical system including the lens unit 1 and the diaphragm 2 is controlled according to various factors such as zooming operation, object motion, object change, change in the ambient brightness of the environment, and photographic effects intended by the photographer. In other words, optical parameters, typical examples of which include focal length, focus position and aperture value, are constantly controlled and vary.

Light that has passed through the optical system including the lens unit 1 and the diaphragm 2 is color-separated by a color separating prism 3 into red (R), green (G) and blue (B), which are then respectively formed on image sensors 41 to 43 as optical images and sequentially converted to image signals. The image signals output from the image sensors 41 to 43 are converted to digital image signals Sr, Sg and Sb that correspond to red (R), green (G) and blue (B), by an analog front end (AFE) 5. Instead of the color separating prism 3 and the image sensors 41 to 43, it is possible to dispose a stand-alone image sensor with a Bayer pattern filter composed of red (R), green (G) and blue (B) filters.

The digital image signals Sr, Sg and Sb are input to an optical correction circuit 6, and a correction value Zt that is input from a coefficient generation circuit 14, which will be described later, is sequentially applied to each pixel. Thus, optical phenomena caused by the lens unit 1 and the diaphragm 2 are corrected, and digital image signals Sr', Sg' and Sb' are output.

Reference numeral 7 denotes a microcomputer that controls the operations of the entire image sensing apparatus.

Reference numeral 8 denotes an actuator for driving the zoom lens of the lens unit 1, the actuator driving the zoom lens based on a driving pulse CL that is output from the microcomputer 7. Reference numeral 9 denotes an actuator for driving the focus lens of the lens unit 1, the actuator driving the focus lens based on a driving pulse CF that is output from the microcomputer 7. Reference numeral 10 denotes an actuator for driving the diaphragm 2, the actuator driving the diaphragm 2 based on a driving pulse Cf that is output from the microcomputer 7.

A timing generator (TG) 11 generates a horizontal synchronizing signal HD and a vertical synchronizing signal VD in accordance with the driving specifications of the image sensors 41 to 43, and supplies the signals to the AFE 5 and a pixel coordinate generation circuit 12, which will be described below. The AFE 5 generates driving signals for the image sensors 41 to 43 based on the horizontal synchronizing signal HD and the vertical synchronizing signal VD, and inputs the signals to the image sensors 41 to 43.

The pixel coordinate generation circuit 12 generates polar coordinates for the current pixel based on optical axis position information Cx and Cy supplied from the microcomputer 7 and the horizontal synchronizing signal HD and the vertical synchronizing signal VD supplied from the TG 11, and supplies the polar coordinates to a coefficient generation circuit 14. Examples of deterioration of image quality caused by the optical system include optical aberrations such as magnification chromatic aberration and distortion aberration, and a decrease in the quantity of ambient light, but these are known to vary according to the image height. For this reason, the pixel position in the image sensors 41 to 43 obtained based on the horizontal synchronizing signal HD and the vertical synchronizing signal VD is converted to polar coordinates represented by a radius Rt from the optical axis and a polar angle θt from the initial line by the pixel coordinate generation circuit 12. Generation of polar coordinates will be described later in detail.

Reference numeral 14 denotes a coefficient generation circuit, the coefficient generation circuit generating a correction value Zt for correcting an optical phenomenon in the optical correction circuit 6 based on the polar coordinates obtained from the pixel coordinate generation circuit 12 and optical correction data Cm (correction information) saved in an optical correction database 13 that is input via the microcomputer 7. The optical correction database 13 is a storage device such as a flash memory.

Next, a process for generating a correction value Zt in the image sensing apparatus configured as described above will be described in detail.

Generation of Polar Coordinates

Figure 2:
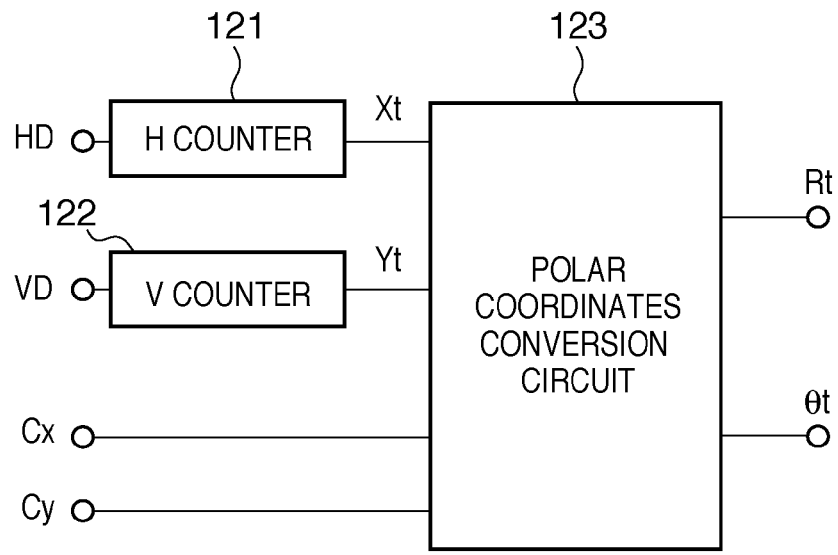
FIG. 2 is a block diagram showing an internal configuration of a pixel coordinate generation circuit according to Embodiment 1.
Figure 5:
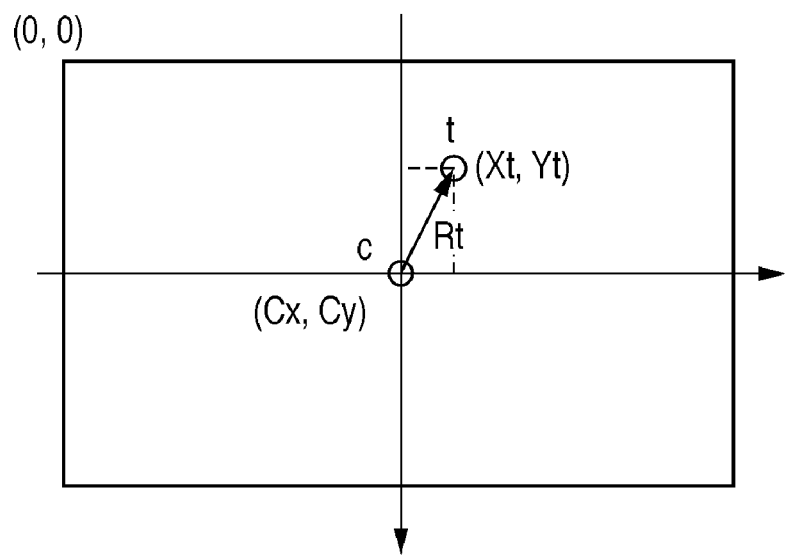
FIG. 5 is a diagram showing an example in which the position of a pixel in the image sensing apparatus is expressed using polar coordinates.

FIG. 2 is a block diagram showing a detailed configuration of the pixel coordinate generation circuit 12. As shown in FIG. 2, an H counter 121 that is reset at the trailing edge of the horizontal synchronizing signal HD and a V counter 122 that is reset at the trailing edge of the vertical synchronizing signal VD output a horizontal counter value Xt and a vertical counter value Yt, respectively. The horizontal counter value Xt and vertical counter value Yt obtained here indicate the coordinates (Xt, Yt) of a pixel, with the coordinates of a pixel located at the left upper corner of the image sensors 41 to 43 set to (0, 0), Xt representing the horizontal direction and Yt representing the vertical direction, as shown in FIG. 5.

The optical axis position information Cx and Cy supplied from the microcomputer 7 indicate the position (coordinates) in which an optical axis C of the optical system constituted by the lens unit 1 and the diaphragm 2 is located in the image sensors 41 to 43.

A polar coordinates conversion circuit 123 converts the horizontal counter value Xt and vertical counter value Yt of a pixel t to polar coordinates with the origin being the optical axis C, based on the optical axis position information Cx and Cy. The polar coordinates can be represented by $$Rt = \sqrt{(Xt - Cx)^2 + (Yt - Cy)^2}$$

$$\theta t = \operatorname{atan}\left(\frac{Yt - Cy}{Xt - Cx}\right).$$

Therefore, the polar coordinates conversion circuit 123 calculates the above equations, and outputs polar coordinate values Rt and θt. The square root operation and the a tan operation can also be implemented with hardware by expressing a known method, such as dichotomy or extraction of square root, in finite word length accuracy in the case of the square root operation, and by high order function approximation or low order piece-wise function approximation in which the XY ratio is sectioned to a predetermined value range in the case of the a tan operation.

Selection of Correction Amount Plot Data Set

Figure 6A:
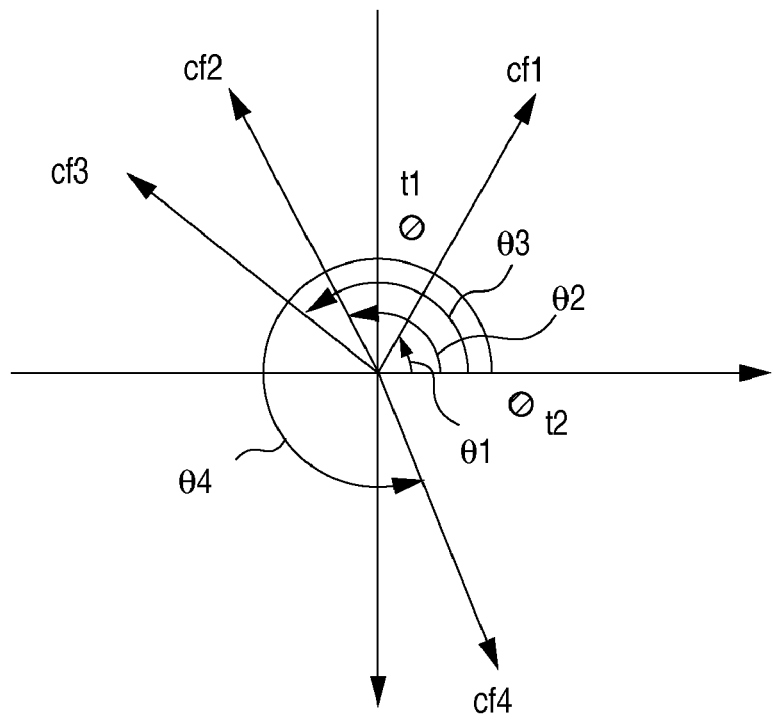
FIGS. 6A and 6B are diagrams showing an example of correction amounts for optical characteristics in which image height is point asymmetrical.
Figure 6B:
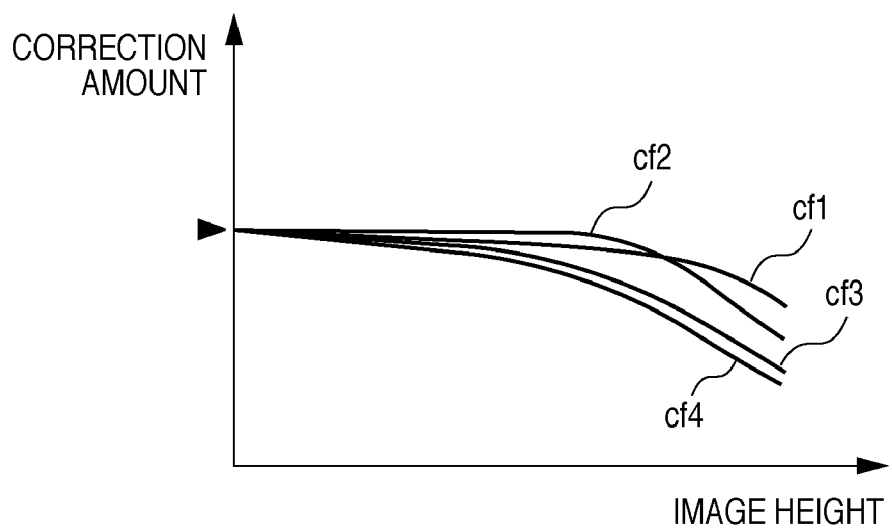

As described above, the optical characteristics of the lens unit 1 including a plurality of lenses and the diaphragm 2 are often point asymmetrical due to the shape of optical members, the physical structure of sensors, and the like. FIG. 6A shows radius directions cf1 to cf4 at polar angles θ1 to θ4 centered on the optical axis C, and FIG. 6B shows an example of appropriate correction amounts for optical characteristics at image heights of the radius directions cf1 to cf4 shown in FIG. 6A. In the example shown in FIGS. 6A and 6B, it is assumed that the optical characteristics have point asymmetry in which the optical characteristics differ depending on the angle, and the correction amounts of the radius directions cf1 to cf4 do not coincide with each other as shown in FIG. 6B.

In Embodiment 1, in order to obtain a correction amount for correcting the deterioration of image quality due to such point asymmetrical optical characteristics, optical correction characteristics information and region information for optical parameters are pre-stored in the optical correction database 13. The optical correction characteristics information stored in the optical correction database 13 can be, for example, a plot data set that directly indicates correction amounts (plot data) at a plurality of preset image heights (radii) of the radius directions at a plurality of polar angles. It is also possible to store, instead of the plot data set, the coefficient term of a function obtained as a result of approximating correction amount characteristics of each radius direction. The region information stored in the optical correction database 13 is information regarding polar coordinates (polar angle and image height), centered on the optical axis, of the position of each stored correction amount.

FIGS. 7A to 7D are diagrams showing an example of a process for obtaining optical correction data, which is input to the coefficient generation circuit 14, from the optical correction characteristics information stored in the optical correction database 13 according to Embodiment 1.

Figure 7A:
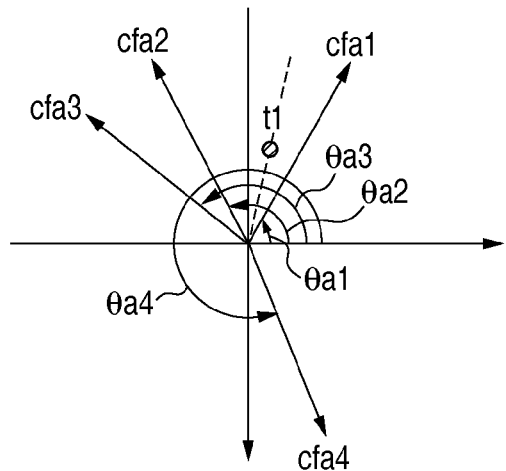
FIGS. 7A to 7D are diagrams illustrating an example of optical correction characteristics information having point asymmetry that is stored in an optical correction database according to Embodiment 1.
Figure 7B:
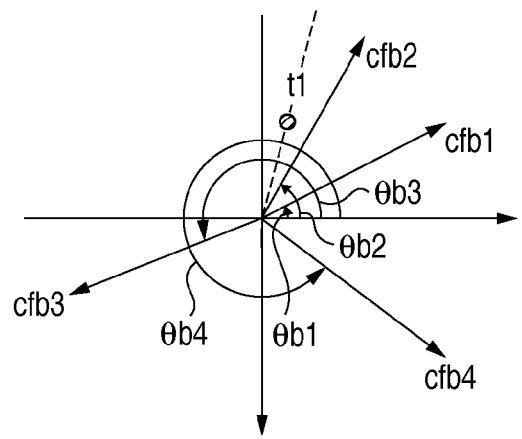

FIG. 7A shows four radius directions cfa1 to cfa4 and the corresponding polar angles θa1 to θa4, which store optical correction characteristics information for an optical parameter Oa. FIG. 7B shows four radius directions cfb1 to cfb4 and the corresponding polar angles θb1 to θb4, which store optical correction characteristics information for an optical parameter Ob. In this manner, in Embodiment 1, optical correction characteristics information is stored for each of a plurality of different optical parameters.

Figure 7C:
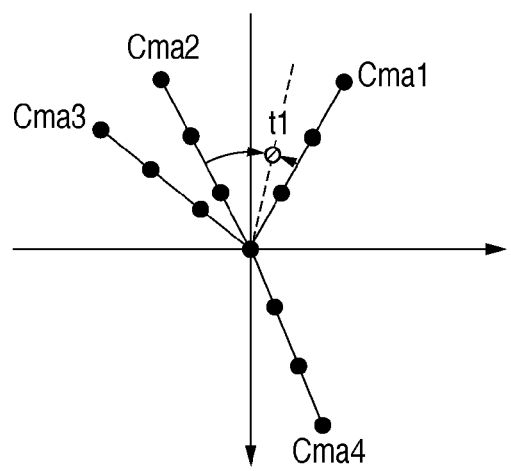
Figure 7D:
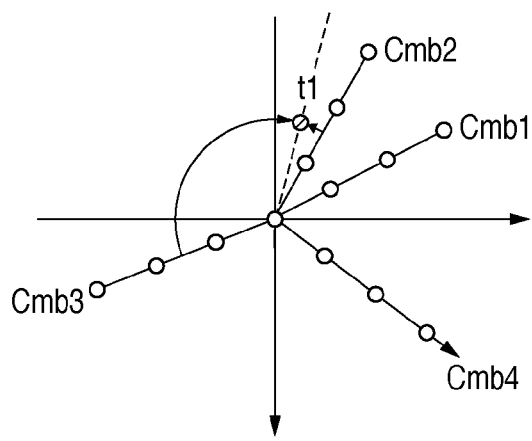

FIGS. 7C and 7D show corresponding positions of the correction amounts included in the optical correction characteristics information for the optical parameters Oa and Ob, respectively. As can be seen from FIGS. 7A and 7C, as the optical correction characteristics information for the optical parameter Oa, a total of 13 correction amounts (the correction amount at the optical axis is a common correction amount) are stored at four image heights of each of the four radius directions cfa1 to cfa4. Sets including the correction amounts (plot data) of each of the radius directions cfa1 to cfa4 and the region information (the polar angles θa1 to θa4 and the image heights) of the respective correction amounts are hereinafter referred to as "correction amount plot data sets Cma1 to Cma4". The correction amount plot data sets Cma1 to Cma4 may also be referred to collectively as a "correction amount plot data set Cma". In addition, four image heights extending from the optical axis toward the periphery are referred to as "image heights 1 to 4", and the correction amounts (plot data) included in the correction amount plot data set Cma1 are referred to as "correction amount plot data Cma11 to Cma14". The correction amount plot data included in the correction amount plot data sets Cma2 to Cma4 are also indicated in the same manner.

Similarly, as can be seen from FIGS. 7B and 7D, as the correction characteristics information for the optical parameter Ob, a total of 13 correction amounts (the correction amount at the optical axis is a common correction amount) are stored at four image heights of each of the four radius directions cfb1 to cfb4. Sets including the correction amounts (plot data) of each of the radius directions cfb1 to cfb4 and the region information (the polar angles θb1 to θb4 and the image heights) of the respective correction amount are hereinafter referred to as "correction amount plot data sets Cmb1 to Cmb4". The correction amount plot data sets Cmb1 to Cmb4 may also be referred to collectively as a "correction amount plot data set Cmb". In addition, four image heights extending from the optical axis toward the periphery are referred to as "image heights 1 to 4", and the correction amounts (plot data) included in the correction amount plot data set Cmb1 are referred to as "correction amount plot data Cmb11 to Cmb14". The correction amount plot data included in the correction amount plot data sets Cmb2 to Cmb4 are also indicated in the same manner.

In FIGS. 7A to 7D, the reason for storing correction amounts at only four image heights in each of the four radius directions at four polar angles is that the memory capacity of the optical correction database 13 is limited, and thus the correction amounts can only be stored discretely. In Embodiment 1, optical correction characteristics information regarding three radius directions is allocated in advance for a polar angle range in which point asymmetrical optical characteristics change significantly, and optical correction characteristics information regarding one radius direction is allocated in advance for a polar angle range in which point asymmetrical optical characteristics change moderately. In other words, the optical correction database 13 stores correction information corresponding to more polar angles with respect to the range having a greater degree of optical characteristics change in the angular direction centered on the optical axis. Accordingly, regarding optical parameter regions, image height positions and polar angles that do not have correction amounts, a correction amount can be acquired by interpolating from neighbor information. It should be noted that the direction and the number of optical correction characteristics information according to the present invention stored in the optical correction database 13 are not limited to those described above, and it is possible to determine the information amount in advance according to the memory capacity allowed by the image sensing apparatus and a tendency in the amount of characteristics change of the optical system.

On the other hand, the optical parameter control unit time (the period in which one image is sensed) is one cycle (one frame period) of the vertical synchronizing signal VD that indicates an update to the image signal, and thus the processing time for an optical correction process allocated by the microcomputer 7 is of course limited. Accordingly, the microcomputer 7 acquires a limited number of plot data and region information (multiple data sets) that can be data-processed during one frame period in the order from a data set corresponding to an optical parameter approximating the current optical parameter Ot.

Accordingly, first, the microcomputer 7 selects two optical parameters proximate to the current optical parameter Ot from among the plurality of optical parameters of the optical correction characteristics information stored in the optical correction database 13. Here, it is assumed that the above-described optical parameters Oa and Ob are selected. Then, the microcomputer 7 outputs the correction amount plot data sets Cma and Cmb corresponding to the selected optical parameters Oa and Ob to the coefficient generation circuit 14 as optical correction data Cm. The optical correction data Cm is output when the microcomputer 7 outputs driving pulses CL, CF and Cf to the lens unit 1 and the diaphragm 2.

Generation of Correction Coefficient

Figure 3:
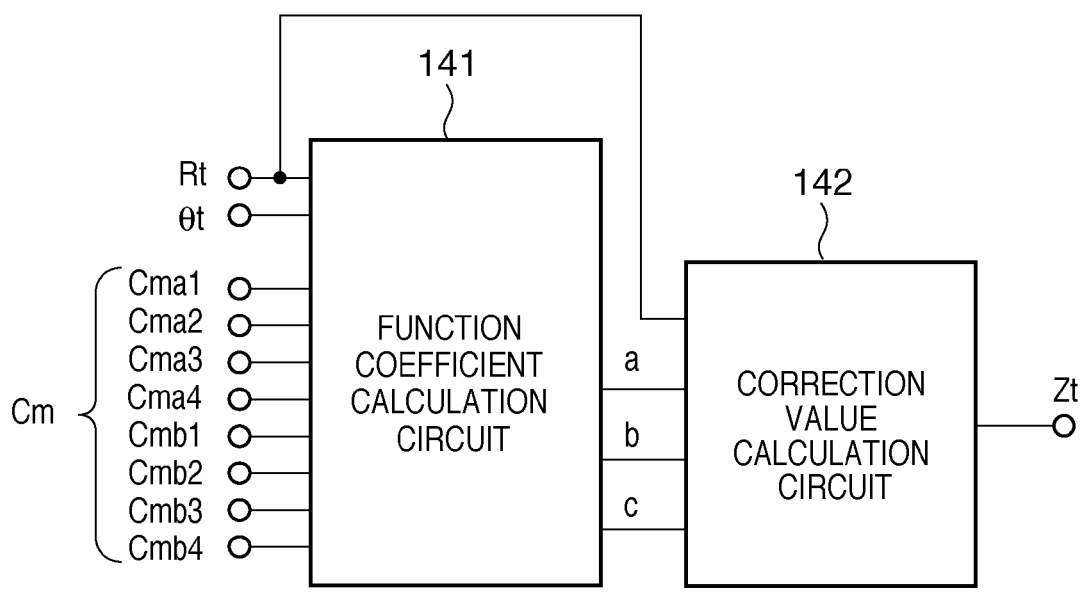
FIG. 3 is a block diagram showing an internal configuration of a coefficient generation circuit according to Embodiment 1.

FIG. 3 is a block diagram showing an example of a configuration of the coefficient generation circuit 14. The polar coordinate values Rt and θt of the pixel currently processed that are output from the pixel coordinate generation circuit 12 and the optical correction data Cm output from the microcomputer 7 are input to the function coefficient calculation circuit 141. Here, a description will be given taking a case where a pixel t1 (radius=Rt1, polar angle=θt1) in FIGS. 7A to 7D is processed as an example.

Figure 8A:
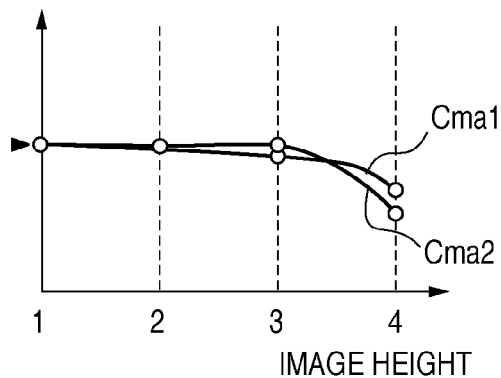
FIGS. 8A to 8F are diagrams illustrating a method for calculating a correction coefficient according to Embodiment 1.

The function coefficient calculation circuit 141 selects two correction amount plot data sets Cma1 and Cma2 corresponding to the polar angles θa1 and θa2 that sandwich the polar angle θt1 of the pixel t1 as shown in FIG. 7C from among the input correction amount plot data sets Cma1 to Cma4. FIG. 8A shows correction amount plot data at four image heights (1 to 4) of the selected correction amount plot data sets Cma1 and Cma2. The function coefficient calculation circuit 141 performs an interpolation process by weighting two correction amount plot data pieces at each image height by using distances between the polar angle θt1 of the pixel t1 and the polar angles θa1, θa2 of the correction amount plots data set Cma1, Cma2. As a result, four weighted average values of the correction amount plot data are calculated as shown in FIG. 8C.

Figure 8B:
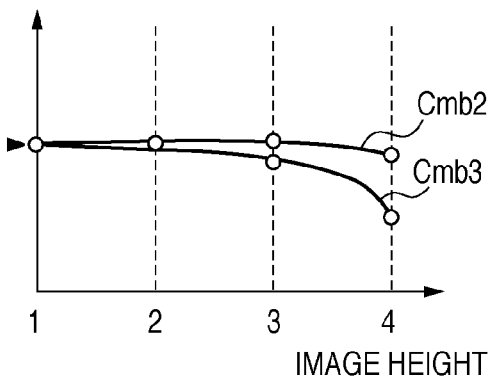

Similarly, the function coefficient calculation circuit 141 selects two correction amount plot data sets Cmb2 and Cmb3 corresponding to the polar angles θb2 and θb3 that sandwich the polar angle θt1 of the pixel t1 as shown in FIG. 7D from among the input correction amount plot data sets Cmb1 to Cmb4. FIG. 8B shows correction amount plot data of four image heights (1 to 4) of the selected correction amount plot data sets Cmb2 and Cmb3. The function coefficient calculation circuit 141 performs an interpolation process by weighting two correction amount plot data pieces at each image height by using distances between the polar angle θt1 of the pixel t1 and the polar angles θb2, θb3 of the correction amount plot data sets Cmb2, Cmb3. As a result, four weighted average values of the correction amount plot data are calculated as shown in FIG. 8D.

Figure 8C:
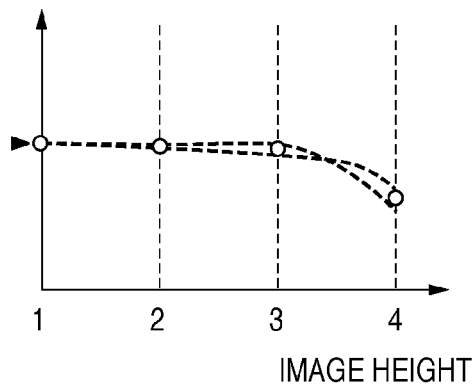
Figure 8D:
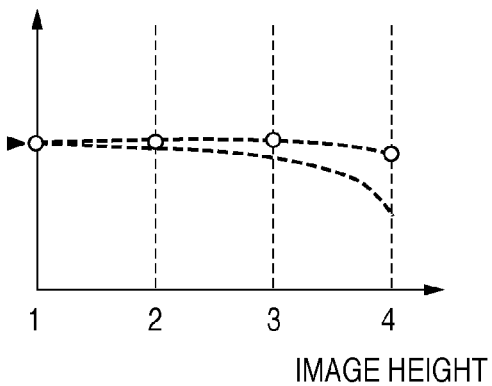
Figure 8E:
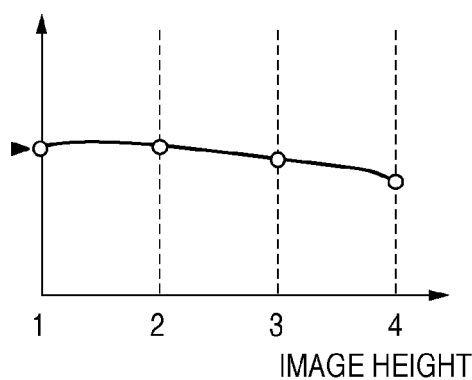

Next, the function coefficient calculation circuit 141 further averages the weighted average values of the correction amount plot data shown in FIGS. 8C and 8D for each image height, and obtains average values of the correction amount plot data as shown in FIG. 8E.

Figure 8F:
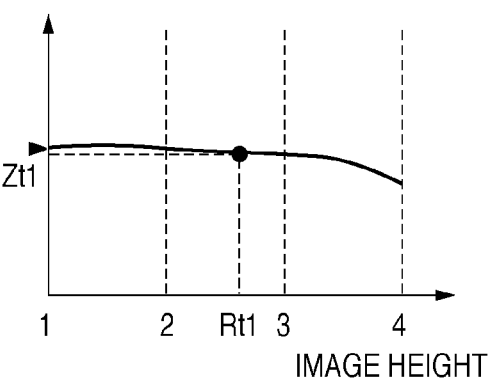

Finally, the function coefficient calculation circuit 141 determines an image height section (in this example, between the image heights 2 and 3) to which the radius Rt1 of the pixel t1 belongs as shown in FIG. 8F, and outputs coefficients a, b and c of an approximation function corresponding to the determined image height section.

A correction value calculation circuit 142 calculates a correction amount Zt1 based on the following equation using the coefficients a, b and c, and the radius Rt1 of the pixel t1.

$$Zt1 = aRt1^2 + bRt1 + c$$

In Embodiment 1, the image height section is approximated with a quadratic function as shown by the above equation, but it is also possible to approximate it with a linear function (linear approximation), or with a tertiary or higher order function.

The thus-obtained correction amount Zt1 for correcting the optical characteristics of the pixel t1 currently processed is output from the correction value calculation circuit 142 of the coefficient generation circuit 14 to the optical correction circuit 6. The correction amount Zt is determined sequentially in the above-described procedure for each pixel t, and then output to the optical correction circuit 6.

Correction of Optical Phenomenon

Figure 4:
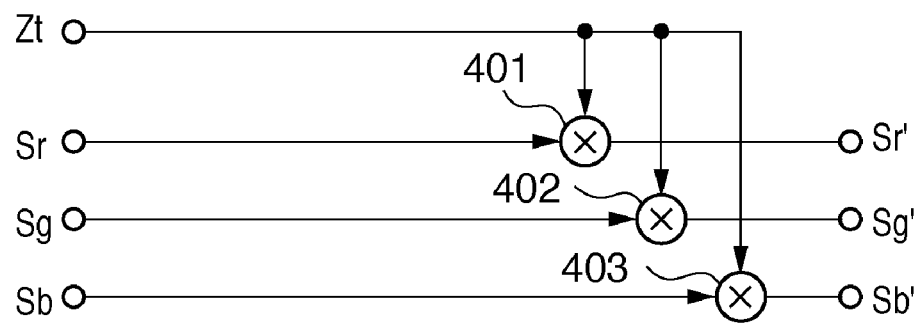
FIG. 4 is a block diagram showing an example of a configuration of an optical correction circuit according to Embodiment 1.

FIG. 4 is a diagram showing an example of a configuration of the optical correction circuit 6. Here, a description will be given taking, as an example, a case of correcting a decrease in the quantity of ambient light as optical characteristics. In the case of correcting a decrease in the quantity of ambient light, the correction amount Zt output from the coefficient generation circuit 14 is a gain value in which a decrease in the quantity of light at the position of the pixel being processed is the reciprocal.

The correction amount Zt input to the optical correction circuit 6 is multiplied by the digital image signals Sr, Sg and Sb output from the AFE 5 by multipliers 401, 402 and 403, and digital image signals Sr', Sg' and Sb' that have undergone the optical correction process are output.

As described above, according to Embodiment 1, the deterioration of image quality due to point asymmetrical optical characteristics can be quickly corrected without increasing the necessary memory capacity.

It should be noted that the optical correction database 13 may store, instead of the plot data that directly indicates the correction amounts of optical characteristics, coefficient terms of functions to which correction amount characteristics are approximated as described above. In this case, "correction amount plot data" in the description given above can be replaced with the order of approximation function.

Variation 1

Figure 9A:
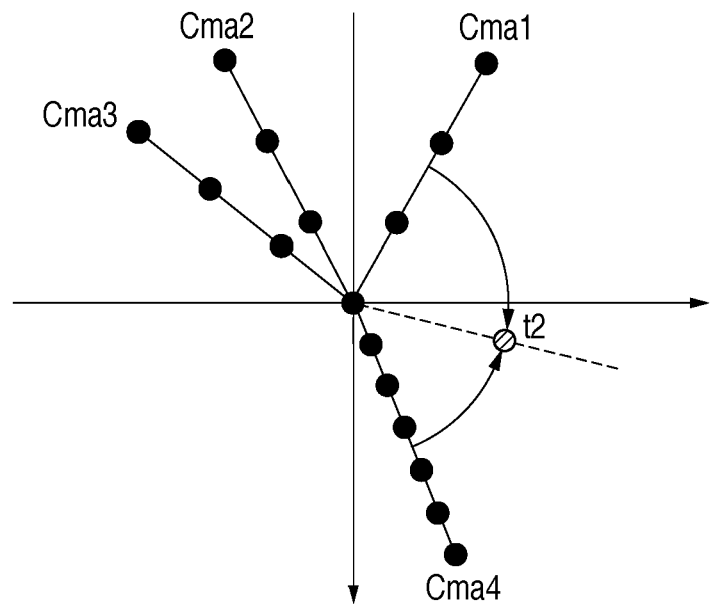
FIGS. 9A and 9B are diagrams illustrating another example of optical correction characteristics information according to Variation 1.
Figure 9B:
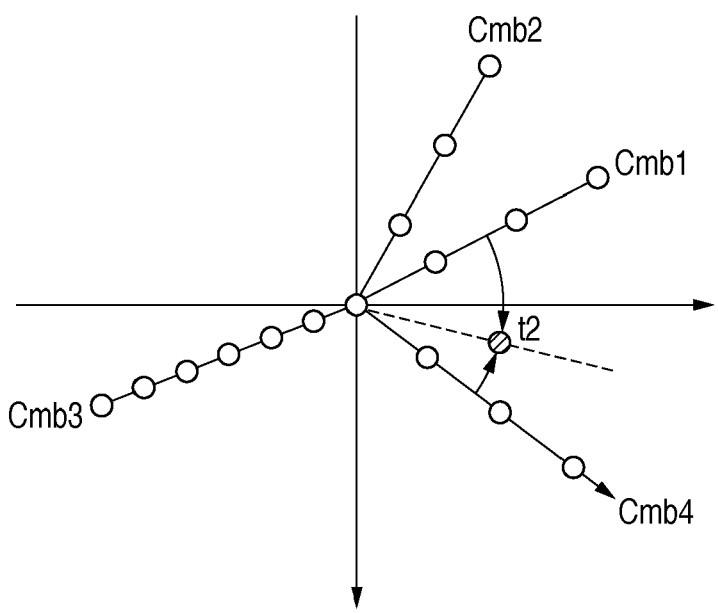

In Embodiment 1 above, there are four correction amount plot data pieces included in the correction amount plot data sets Cma and Cmb in each radius direction as shown in FIGS. 7A to 7D. In Variation 1, as shown in FIGS. 9A and 9B, more correction amount plot data at different image heights is assigned to radius directions included in a range in which point asymmetry in the angular direction centered on the optical axis changes moderately (Cma4 and Cmb3). This is to improve the accuracy of interpolation operation in a range in which point asymmetry in the angular direction centered on the optical axis changes moderately, which will be described taking, as an example, a case of obtaining a correction coefficient of a pixel t2 (radius=Rt2, polar angle=θt2) shown in FIGS. 9A and 9B. In Variation 1, similar to Embodiment 1, it is assumed that correction amount plot data sets Cma and Cmb have been selected based on the optical parameter.

Figure 10A:
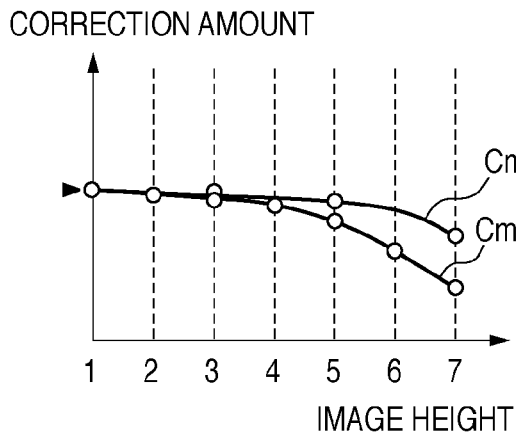
FIGS. 10A to 10F are diagrams illustrating a method for calculating a correction coefficient according to Variation 1.
Figure 10B:
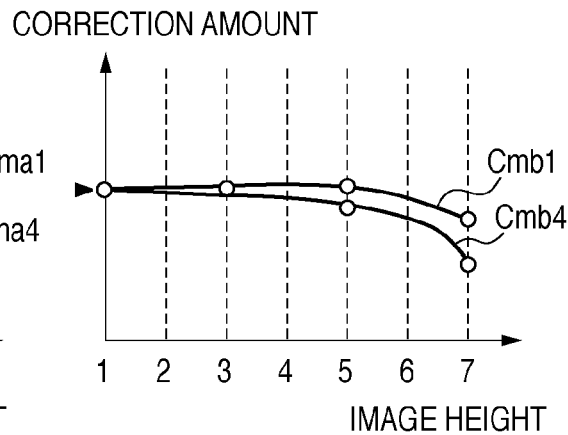

The function coefficient calculation circuit 141 selects two correction amount plot data sets Cma1 and Cma4 that sandwich the pixel t2 from among correction amount plot data sets Cma1 to Cma4 based on the polar angle θt2 of the pixel t2 as can be seen from FIG. 9A. In this case, as shown in FIG. 10A, the correction amount plot data sets Cma1 and Cma4 include four and seven correction amount plot data pieces, respectively. Then, among the correction amount plot data provided in the respective image heights, if there are two correction amount plot data pieces at the same height, an interpolation process is performed by weighting the data by using distances between the polar angle θt2 of the pixel t2 and the polar angles θa1, θa4 of the correction amount plot data sets Cma1, Cma4. As for the image heights (the image heights 2, 4 and 6) that have only one correction amount plot data piece, first, correction amount plot data Cma12, Cma14 and Cma16 of the correction amount plot data set Cma1 are obtained by averaging the correction amount plot data at the preceding and subsequent image heights. Then, a weighted interpolation process is performed on the determined values and correction amount plot data Cma42, Cma44 and Cma46 of the correction amount plot data set Cma4. As a result, seven weighted average values of the correction amount plot data are calculated as shown in FIG. 10C.

On the other hand, the function coefficient calculation circuit 141 selects two correction amount plot data sets Cmb1 and Cmb4 that sandwich the pixel t2 from among correction amount plot data sets Cmb1 to Cmb4 based on the polar angle θt2 of the pixel t2. FIG. 9B shows correction amount plot data at four image heights of the selected correction amount plot data sets Cmb1 and Cmb4. Then, the function coefficient calculation circuit 141 performs an interpolation process by weighting two correction amount plot data pieces at each image height by using distances between the polar angle θt2 of the pixel t2 and the polar angles θb1, θb4 of the correction amount plot data sets Cmb1, Cma4. As a result, four weighted average values of the correction amount plot data are calculated as shown in FIG. 10D.

Figure 10C:
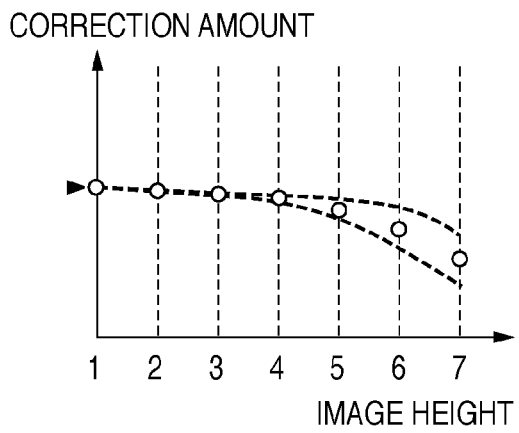
Figure 10D:
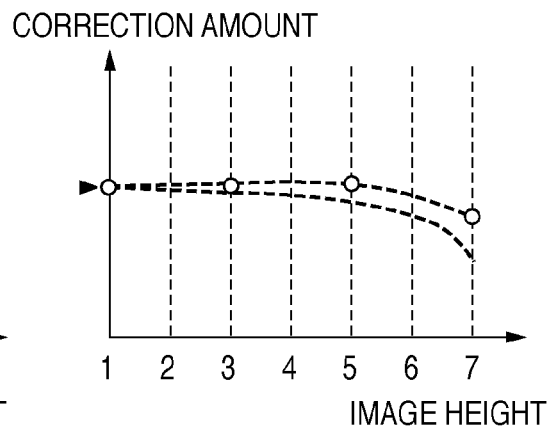
Figure 10E:
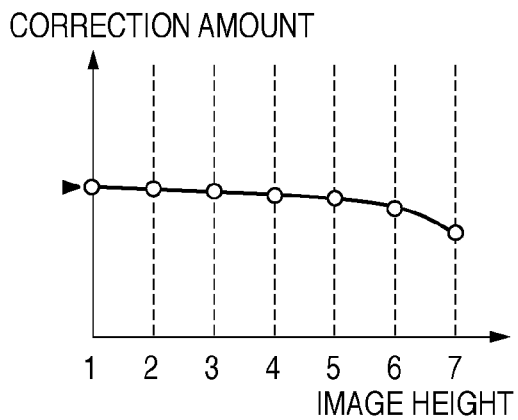

Next, the function coefficient calculation circuit 141 further averages the weighted average values of the correction amount plot data shown in FIGS. 10C and 10D for each image height, and obtains average values of the correction amount plot data as shown in FIG. 10E. In this example, there are no weighted average values of the correction amount plot data sets Cmb1 and Cmb4 corresponding to the image heights 2, 4 and 6. Accordingly, first, weighted average values at the image heights 2, 4 and 6 are determined using the weighted average values at the preceding and subsequent image heights, which are then averaged with the weighted average values of the correction amount plot data sets Cma1 and Cma4.

Figure 10F:
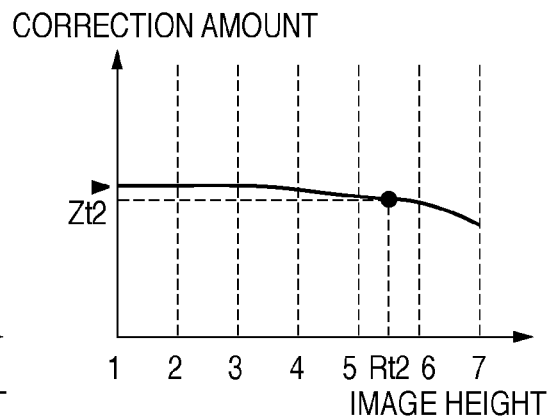

Finally, the function coefficient calculation circuit 141 determines an image height section (in this example, between the image heights 5 and 6) to which the radius Rt2 of the pixel t2 belongs as shown in FIG. 10F, and outputs coefficients a, b and c of an approximation function corresponding to the determined image height section.

The correction value calculation circuit 142 calculates a correction amount Zt2 based on the following equation using the coefficients a, b and c, and the radius Rt2 of the pixel t2.

$$Zt2 = aRt2^2 + bRt2 + c$$

In Variation 1, the image height section is approximated with a quadratic function as shown by the above equation, but it is also possible to approximate it with a linear function (linear approximation), or with a tertiary or higher order function.

The thus-obtained correction amount Zt2 for correcting the optical characteristics of the pixel t2 currently processed is output from the correction value calculation circuit 142 of the coefficient generation circuit 14 to the optical correction circuit 6.

Variation 2

In Embodiment 1 and Variation 1 given above, the image heights of the correction amount plot data included in the correction amount plot data sets Cma and Cmb are spaced equidistant. However, as shown in FIGS. 11A and 11B, by assigning more correction plot data in an image height region in which the point asymmetry changes significantly (a high image-height region in this diagram), the interpolation operation accuracy can be increased.

Figure 11A:
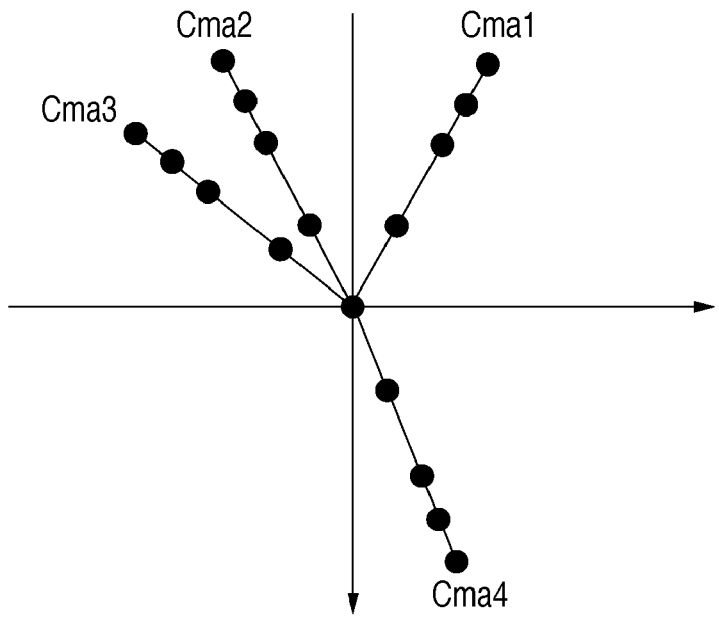
FIGS. 11A and 11B are diagrams illustrating another example of optical correction characteristics information according to Variation 2.
Figure 11B:
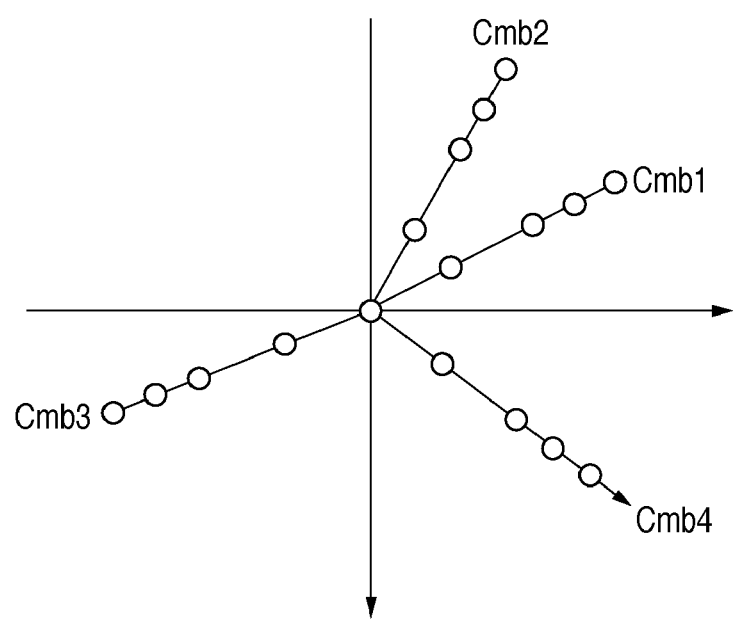

The method for determining a correction coefficient by using correction plot data sets Cma and Cmb shown in FIGS. 11A and 11B is the same as that described in connection to FIGS. 8A to 8F in Embodiment 1 above, and thus a description thereof is omitted here.

Embodiment 2

Embodiment 1 given above described the case of correcting a decrease in the quantity of ambient light as optical characteristics. In Embodiment 2, a case of correcting a magnification chromatic aberration or distortion aberration will be described. The overall configuration of the apparatus is the same as that shown in FIG. 1, and thus a description thereof is omitted here.

Magnification chromatic aberration correction and distortion aberration correction are processes for repositioning a pixel to a pixel position (coordinates) at which obtained image data at the pixel is to be positioned in the absence of a magnification chromatic aberration or distortion aberration, and not processes for correcting image data itself. Accordingly, in Embodiment 2, the direction and distance of movement of a pixel (coordinates) are stored as correction amount plot data.

Here, the correction coefficient Zt is the amount of offset in which the amount of offset of the pixel position is separated into offset components in the horizontal and vertical directions, and hereinafter, the coefficient of an offset component of red (R) in the horizontal direction is referred to as "ZtHr", and the coefficient of an offset component of red (R) in the vertical direction is referred to as "ZtVr". Likewise, the coefficient of an offset component of green (G) in the horizontal direction is referred to as "ZtHg", and the coefficient of an offset component of green (G) in the vertical direction is referred to as "ZtVg". The coefficient of an offset component of blue (B) in the horizontal direction is referred to as "ZtHb", and the coefficient of an offset component of blue (G) in the vertical direction is referred to as "ZtVb". Accordingly, in Embodiment 2, as optical correction characteristics information, correction amount plot data with respect to each color of R, G and B in each of the horizontal and vertical directions is provided. And, by independently determining a correction coefficient with respect to each color in each direction in the same manner as described above, correction coefficients ZtHr, ZtVr, ZtHg, ZtVg, ZtHb and ZtVb can be obtained.

Figure 12A:
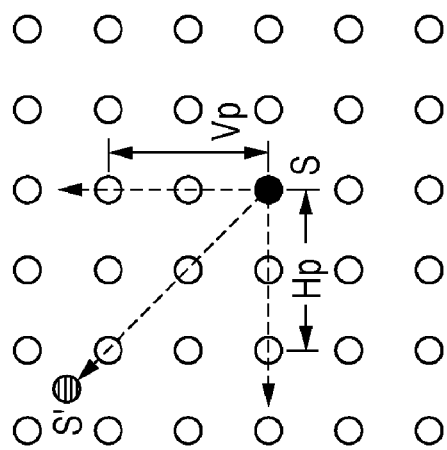
FIGS. 12A to 12C are schematic diagrams illustrating processing of a magnification chromatic aberration correction circuit or a distortion aberration correction circuit according to Embodiment 2.
Figure 12B:
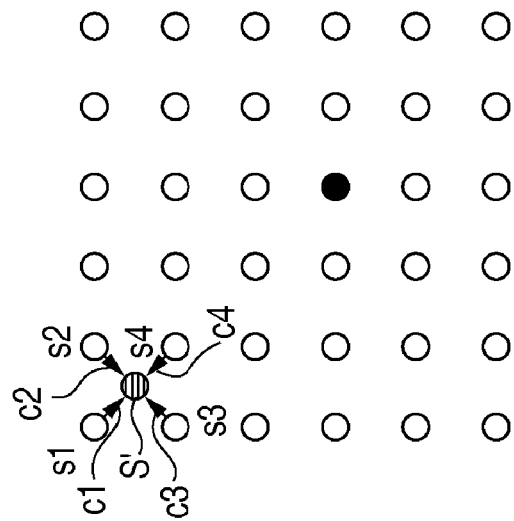
Figure 12C:
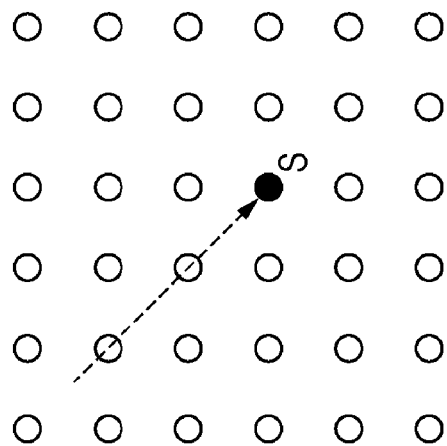

FIGS. 12A to 12C are diagrams showing a concept of correcting a pixel position offset. In FIG. 12A, the black dot indicates the position of a pixel S being processed, and the gray dot is an imaginary pixel S' indicating the position in which the image signal that should have been obtained at the position of the pixel S is offset and imaged due to the influence of a magnification chromatic aberration or distortion aberration.

In order to correct a magnification chromatic aberration or distortion aberration, the imaginary pixel S' whose phase has been offset by an amount of Hp in the horizontal direction and an amount of Vp in the vertical direction is obtained, and the pixel is repositioned in the position of the pixel S of interest.

The imaginary pixel S' can be generated by performing an weighted interpolation operation using pixels s1, s2, s3 and s4 that are proximate to the imaginary pixel S' and that actually obtained image signals as shown in FIG. 12B and inter-pixel distances c1, c2, c3 and c4 between the pixels s1, s2, s3 and s4 and the imaginary pixel S'. The generated imaginary pixel S' is replaced in the position of the pixel S as shown in FIG. 12C, whereby the magnification chromatic aberration or distortion aberration is corrected.

Figure 13:
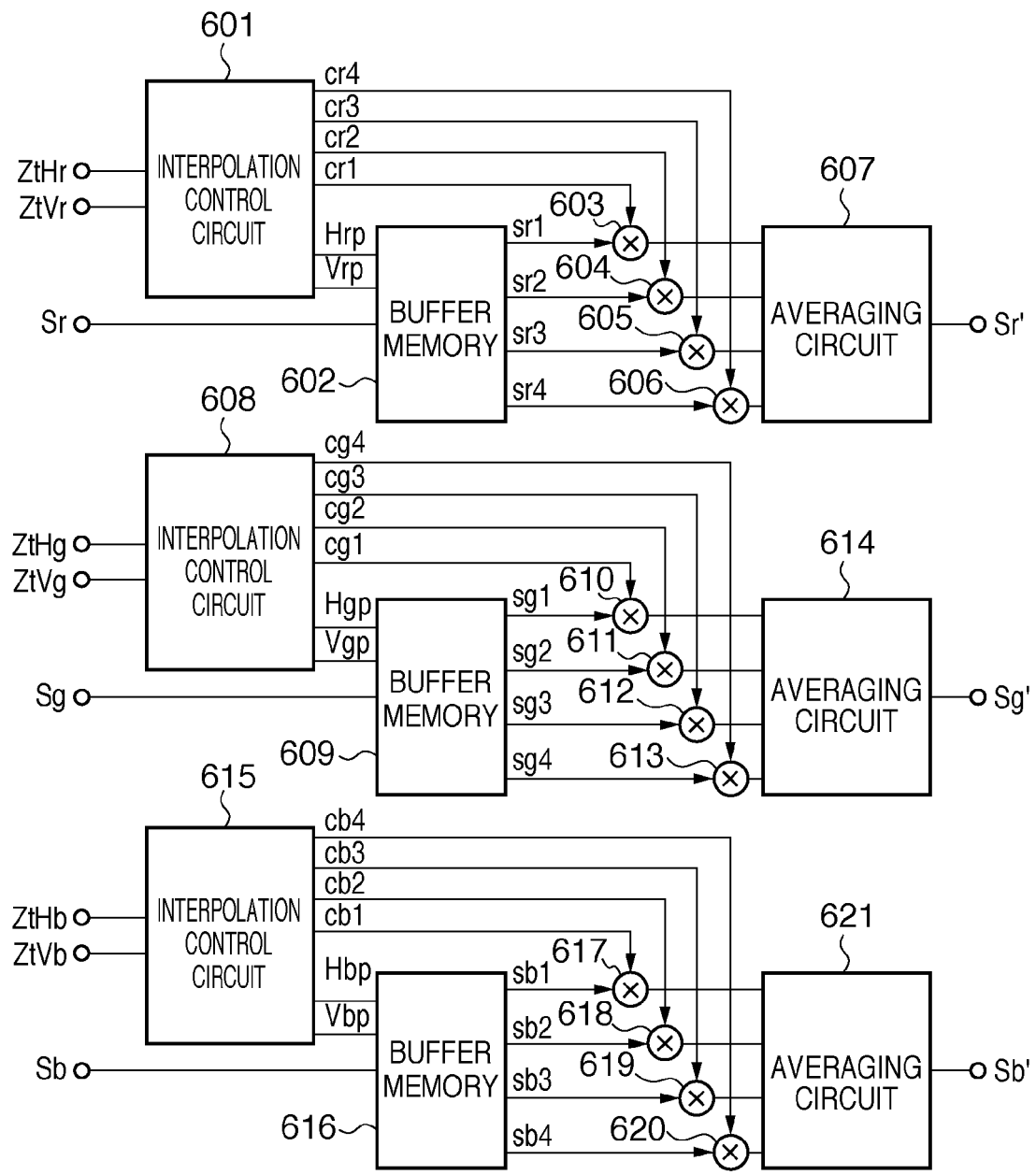
FIG. 13 is a block diagram showing an example of a configuration of an optical correction circuit according to Embodiment 2.

FIG. 13 is a block diagram showing a configuration of the optical correction circuit 6 to implement the process shown in FIGS. 12A to 12C when the optical correction circuit 6 is a magnification chromatic aberration correction circuit or a distortion aberration correction circuit.

First, correction of an R component will be described. The correction coefficients ZtHr and ZtVr input to the optical correction circuit 6 are input to an interpolation control circuit 601, and integer parts thereof are output as Hrp and Vrp. The interpolation control circuit 601 converts decimal parts to interpolation coefficients cr1, cr2, cr3 and cr4 by weighting using the inter-pixel distances between the reference pixels sr1, sr2, sr3 and sr4 and the imaginary pixel Sr', and outputs the result.

A buffer memory 602 stores in sequence digital image signals Sr in the horizontal and vertical directions of a plurality of pixels, and sequentially outputs signals of the pixels stored in the positions indicated by Hrp and Vrp for respective pixels as signals of the reference pixels sr1, sr2, sr3 and sr4 that are proximate to the imaginary pixel Sr'.

The corrected digital image signal Sr' can be represented by $$Sr' = \frac{\sum_{k=1}^{4} sr_k \cdot cr_k}{4}.$$

In this manner, signals of the reference pixels sr1, sr2, sr3 and sr4 are multiplied by interpolation coefficients cr1, cr2, cr3 and cr4 by multipliers 603, 604, 605 and 606, respectively, and averaged by an averaging circuit 607, and the corrected digital image signal Sr' is output.

For an G component and a B component, the same process as in the case of the R component is performed by interpolation control circuits 608 and 615, buffer memories 609 and 616, multipliers 610 to 613 and 617 to 620, and averaging circuits 614 and 621. Then, corrected digital image signals Sg' and Sb' are output, respectively.

Embodiment 3

Figure 14:
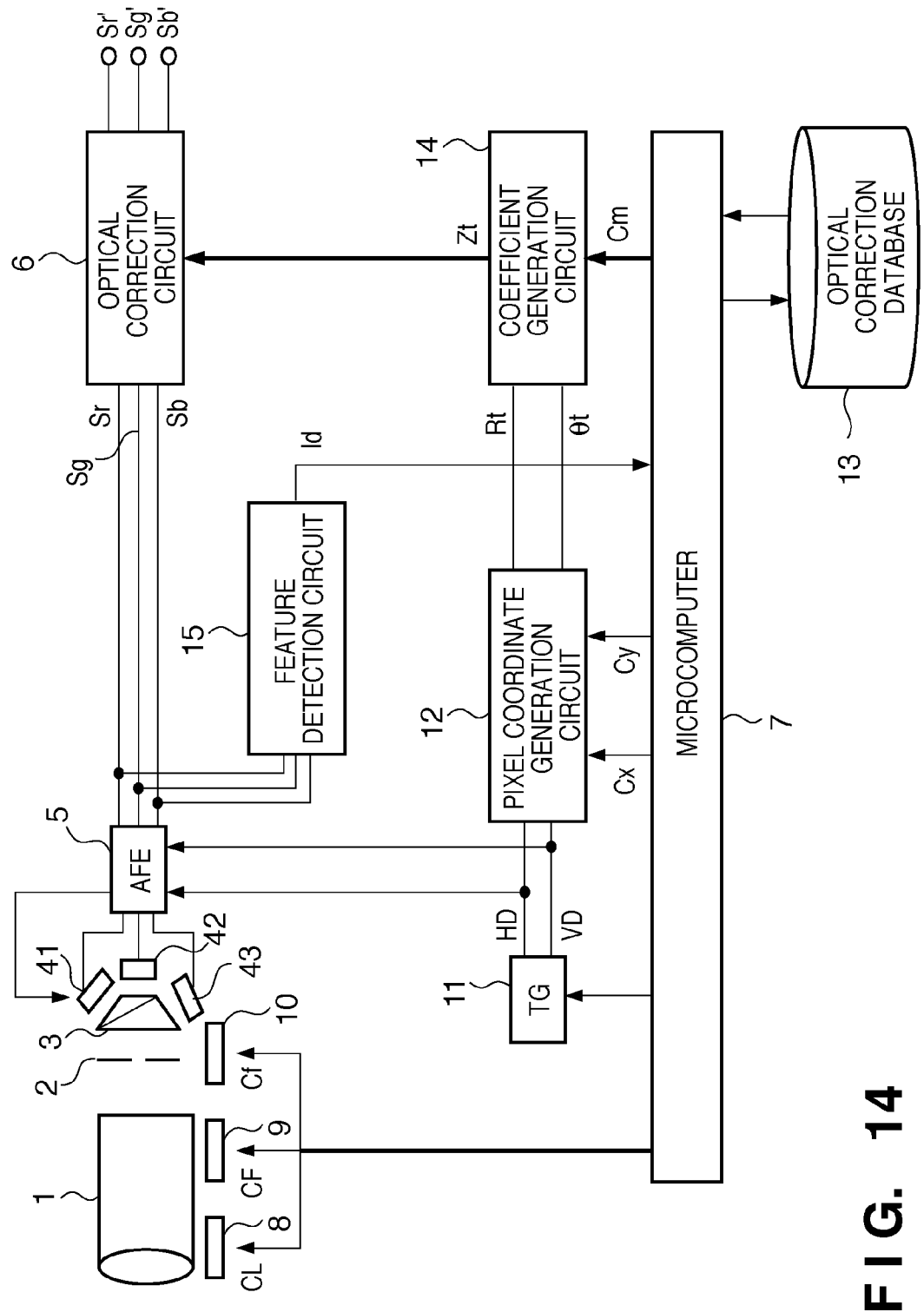
FIG. 14 is a block diagram showing a schematic configuration of an image sensing apparatus according to Embodiment 3.

Next, Embodiment 3 of the present invention will be described. FIG. 14 is a block diagram showing a schematic configuration of an image sensing apparatus according to Embodiment 3. The same components as those of the image sensing apparatus of FIG. 1 are given the same reference numerals, and descriptions thereof are omitted here. The difference from Embodiment 1 of the present invention is that a feature detection circuit 15 that detects features of captured images is disposed prior to the optical correction circuit 6, and that the microcomputer 7 acquires a feature evaluation value Id (feature amount).

The feature detection circuit 15 carries out at least one of contrast detection, high frequency component detection and motion detection on the digital image signals Sr, Sg and Sb, and outputs a feature evaluation value Id.

Figure 15A:
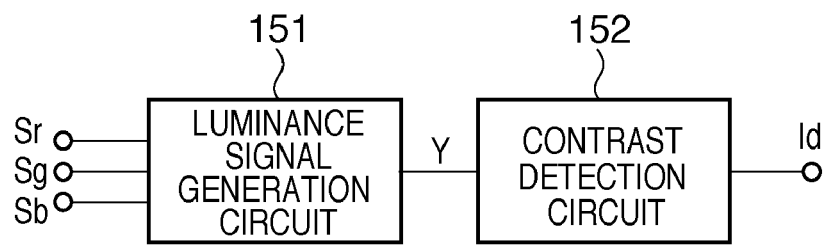
FIGS. 15A to 15C are block diagrams showing an example of a configuration of a feature detection circuit according to Embodiment 3.

In the case of contrast detection, the feature detection circuit 15 is configured as shown in FIG. 15A, for example. The digital image signals Sr, Sg and Sb are input to a luminance signal generation circuit 151, where the digital image signals Sr, Sg and Sb are mixed by using, for example, the following general luminance generation equation:

$$Y = 0.299Sr + 0.587Sg + 0.114Sb$$

and a luminance signal Y is output. A contrast detection circuit 152 can be, for example, a sobel filter, and outputs a primary differential value, which is an output of the filter, as a feature evaluation value Id.

Figure 15B:
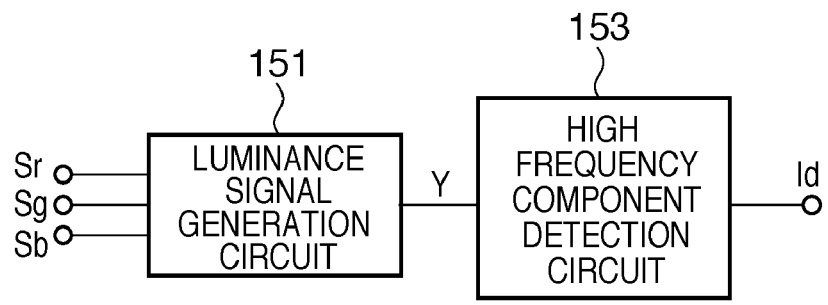

In the case of high frequency component detection, the feature detection circuit 15 is configured as shown in FIG. 15B, for example. The digital image signals Sr, Sg and Sb are input to the luminance signal generation circuit 151, and as in the case of contrast detection, a luminance signal Y is output. A high frequency component detection circuit 153 can be, for example, a band-pass filter (BPF), and outputs a response value in a predetermined frequency band, which is an output of the filter, as a feature evaluation value Id.

Figure 15C:
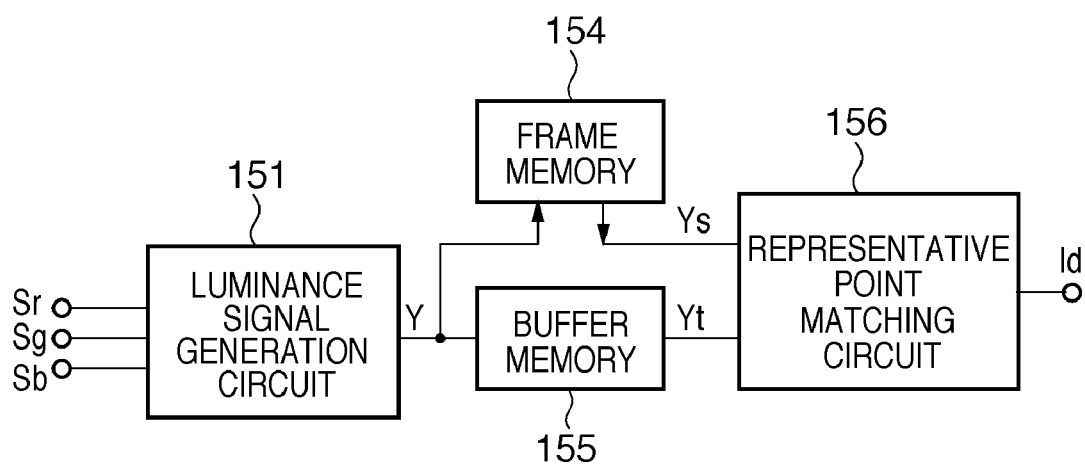

In the case of motion detection, the feature detection circuit 15 is configured as shown in FIG. 15C, for example. This is a general configuration to which a representative point matching operation is applied. The digital image signals Sr, Sg and Sb are input to the luminance signal generation circuit 151, which, as in the case of contrast detection, outputs a luminance signal Y.

Figures 16A, 16B:
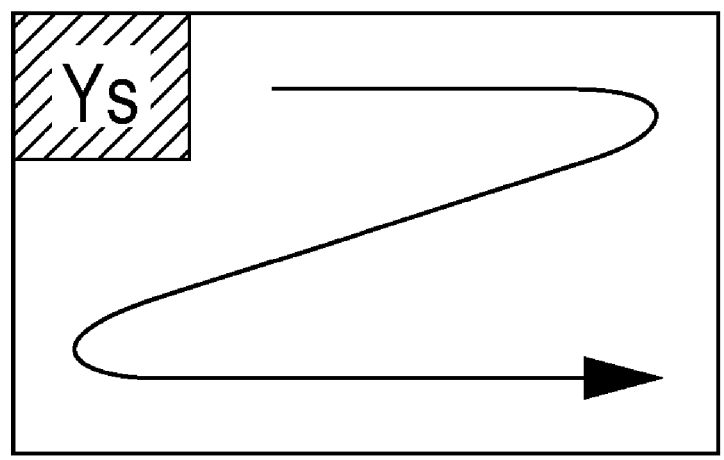
FIGS. 16A and 16B are diagrams illustrating a method for acquiring a feature evaluation value by matching.

A frame memory 154 has a capacity capable of storing representative point luminance signals of at least two frames, and stores a representative point luminance signal obtained as a result of resampling the luminance signal Y obtained from the luminance signal generation circuit 151 in the horizontal and vertical directions at a predetermined pixel spacing. A similar representative point luminance signal is also stored in a buffer memory 155. The representative point luminance signal Ys is sequentially read from the frame memory 154 in units of a rectangular region of a predetermined size indicated by hatching in FIG. 16A from the upper left address of the frame memory 154 to the lower right address. On the other hand, from the buffer memory 155, the representative point luminance signals Yt of sections obtained by dividing an image into sections of a predetermined size as shown by a rectangular region in FIG. 16B are successively read from section number 1 to 12.

A representative point matching circuit 156 receives input of a luminance signal Yt of section number 1 from the buffer memory 155 as well as input of the luminance signal Ys from the frame memory 154 sequentially from the upper left address of the frame memory 154 to the lower right address. Then, the representative point matching circuit 156 obtains a motion vector of section number 1 from the position at which the luminance signal Ys was read when the difference between luminance signal Yt and luminance signal Ys was the smallest and the position of section number 1 from which the luminance signal Yt was read in the buffer memory 155, and outputs the motion vector as a feature evaluation value Id.

When the matching operation for section number 1 ends in the manner described above, a luminance signal Yt of section number 2 is read from the buffer memory 155, and input to the representative point matching circuit 156. Then, from the frame memory 154, the luminance signal Ys is read sequentially from the upper left address of the frame memory 154 to the lower right address while it is being updated, and the difference with the luminance signal Yt is determined. In the same manner as section number 1, a motion vector of section number 2 is output as a feature evaluation value Id.

After that, the matching operation is repeated in the same manner for section numbers 3 to 12, whereby the feature detection circuit 15 outputs motion vectors of all sections from section number 1 to 12 as feature evaluation values Id. The thus-obtained feature evaluation values Id are combined and processed into a single feature evaluation value Id by the microcomputer 7.

Regions with a high contrast or a high frequency component are likely to be regions where magnification chromatic aberration is noticeable, and regions with a large amount of motion are likely to be regions where a decrease in the quantity of ambient light is noticeable. It is thus possible to presume that regions whose feature evaluation value Id is large are regions where magnification chromatic aberration or a decrease in the quantity of ambient light is likely to be noticeable.

For this reason, the microcomputer 7 adjusts the reading of correction amount plot data set Cm for the region whose feature evaluation value Id is large such that the accuracy of approximation of the correction amount Zt is higher than other region by using a method described below.

When outputting the driving pulses CL, CF and Cf to the lens unit 1 and the diaphragm 2, as described above, the microcomputer 7 accesses the optical correction database 13, and outputs the correction amount plot data set Cm, which is provided to the coefficient generation circuit 14, in accordance with the feature evaluation value Id. Hereinafter, control performed by the microcomputer 7 based on the feature evaluation value Id in such a case will be described.

The microcomputer 7 acquires a limited number of correction amount plot data and region information (multiple data sets) that can be data-processed during one frame period, which is an optical parameter control unit time, in the proximity of the current optical parameter. Prior to this, the microcomputer 7 determines a region that has the highest feature evaluation value Id by viewing the distribution of feature evaluation values Id within the screen, and determines a polar angle θi including that region.

Figure 17A:
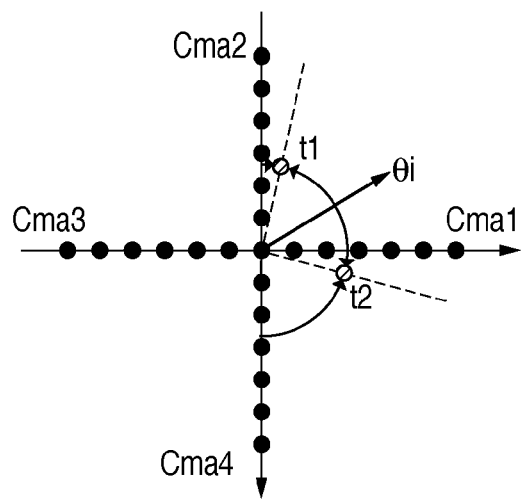
FIGS. 17A to 17D are diagrams illustrating an example of optical correction characteristics information according to Embodiment 2.
Figure 17B:
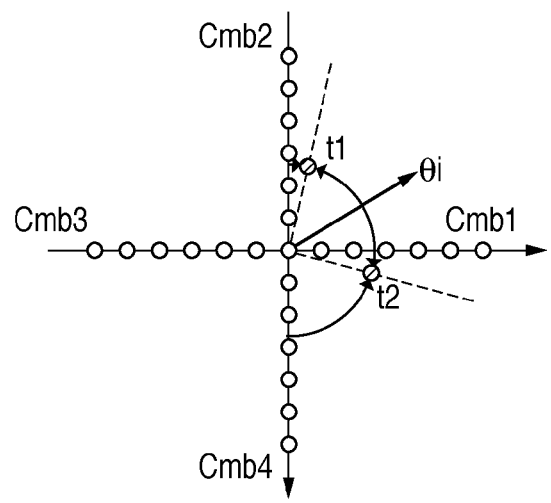

Next, the microcomputer 7 selects two optical parameters Oa and Ob in the proximity of the current optical parameter from among the optical correction characteristics information stored in the optical correction database 13. In the optical correction database 13, for example, a four-directional plot data set of the optical parameter Oa as shown in FIG. 17A and a four-directional plot data set of the optical parameter Ob as shown in FIG. 17B are stored. In Embodiment 3, it is assumed that seven plot data pieces are stored in each direction.

Figure 17C:
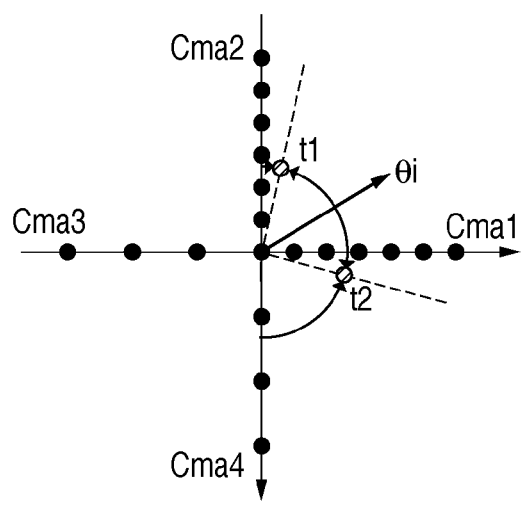
Figure 17D:
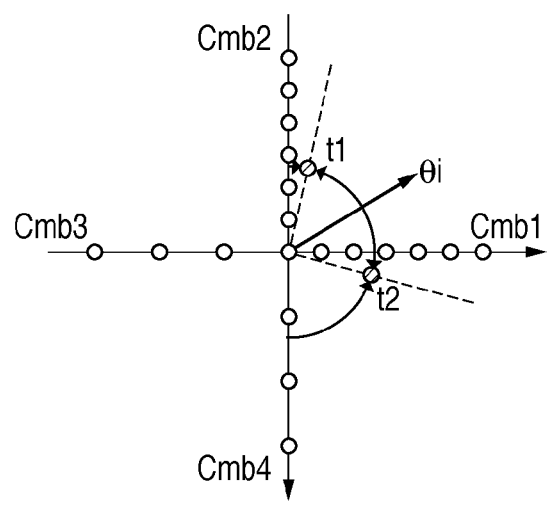

The microcomputer 7 performs control such that, when reading correction amount plot data sets Cma and Cmb corresponding to the optical parameters Oa and Ob from the optical correction database 13, more correction amount plot data sets are read from two directions that sandwich the polar angle θi. For example, in FIG. 17A that corresponds to the parameter Oa, seven plot data pieces are read as correction amount plot data sets Cma1 and Cma2 as shown in FIG. 17C. As correction amount plot data sets Cma3 and Cma4, four plot data pieces are read. Similarly, in FIG. 17B that corresponds to the optical parameter Ob, seven plot data pieces are read as correction amount plot data sets Cmb1 and Cmb2 and four plot data pieces are read as correction amount plot data sets Cmb3 and Cmb4, as shown in FIG. 17D. The correction amount plot data sets Cma and Cmb (optical correction data Cm) read from the optical correction database 13 in this manner is output to the coefficient generation circuit 14.

The coefficient generation circuit 14 performs the same operation as that described in connection to FIGS. 10A to 10F in Variation 1 above, and outputs the obtained correction amount Zt to the optical correction circuit 6.

As described above, according to Embodiment 3, in addition to the effects of Embodiment 1, the accuracy of correction can be further enhanced according to the feature information of the image signal.

In Embodiments 1 to 3 described above, the number of plot data in each radius direction is set to four or seven, but the present invention is not limited thereto, and the number can be set to any number according to the processing capability of the apparatus as long as the processing of one image can be finished within one frame period.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-221443, filed on Sep. 25, 2009, which is hereby incorporated by reference herein in its entirety.

What is claimed is:

1. An image sensing apparatus comprising:
   a control unit that controls an optical member by using a parameter;
   an image sensing unit that generates image data from an object image formed via the optical member;
   a storage unit that stores, with respect to a plurality of setting values assumable by the parameter for controlling the optical member, correction information for correcting deterioration of image quality of image data that is caused by characteristics of the optical member and that is point asymmetrical with respect to an optical axis of the optical member, the correction information corresponding to a plurality of image heights at a plurality of polar angles in a polar coordinate system centered on the optical axis of the optical member;
   a reading unit that, when the control unit controls the optical member by using the parameter, reads correction information corresponding to a plurality of setting values that are close to a setting value of the parameter used by the control unit from the correction information stored in the storage unit;

a conversion unit that converts a pixel position of the image data generated by the image sensing unit to polar coordinates centered on the optical axis of the optical member;

a generation unit that generates correction information that corresponds to the setting value of the parameter used by the control unit and the polar coordinates converted by the conversion unit by interpolating the correction information read by the reading unit; and a correction unit that corrects the image data at the pixel position at the polar coordinates by using the correction information generated by the generation unit, wherein the storage unit stores correction information corresponding to more polar angles in a range having a greater degree of change in the deterioration of image quality in an angular direction centered on the optical axis of the optical member.

2. The image sensing apparatus according to claim 1, wherein the storage unit stores more correction information at different image heights in a first polar angle than correction information at different image heights in a second polar angle included in a range having a greater degree of change in the deterioration of image quality in the angular direction centered on the optical axis of the optical member than a range that includes the first polar angle.

3. The image sensing apparatus according to claim 1, wherein the storage unit stores more correction information in a first image height region of a certain polar angle than correction information in a second image height region having a smaller degree of change in the deterioration of image quality than the first image height region of the polar angle.

4. The image sensing apparatus according to claim 1, wherein the deterioration of image quality is based on at least a decrease in a quantity of ambient light or an optical aberration of the optical member.

5. An image sensing apparatus comprising:

a control unit that controls an optical member by using a parameter;

an image sensing unit that generates image data from an object image formed via the optical member;

a storage unit that stores, with respect to a plurality of setting values assumable by the parameter for controlling the optical member, correction information for correcting deterioration of image quality of image data that is caused by characteristics of the optical member and that is point asymmetrical with respect to an optical axis of the optical member, the correction information corresponding to a plurality of image heights at a plurality of polar angles in a polar coordinate system centered on the optical axis of the optical member;

a reading unit that, when the control unit controls the optical member by using the parameter, reads correction information corresponding to a plurality of setting values that are close to a setting value of the parameter used by the control unit from the correction information stored in the storage unit;

a conversion unit that converts a pixel position of the image data generated by the image sensing unit to polar coordinates centered on the optical axis of the optical member;

a generation unit that generates correction information that corresponds to the setting value of the parameter used by the control unit and the polar coordinates converted by the conversion unit by interpolating the correction information read by the reading unit;

a correction unit that corrects the image data at the pixel position at the polar coordinates by using the correction information generated by the generation unit; and a feature detection unit that detects a feature amount for each region of the image data generated by the image sensing unit, wherein the reading unit reads more correction information with respect to a range having a larger feature amount detected by the feature detection unit from among the correction information stored in the storage unit.

6. The image sensing apparatus according to claim 5, wherein the deterioration of image quality is based on at least a decrease in a quantity of ambient light or an optical aberration of the optical member.

7. An image data correction method of an image sensing apparatus, the image sensing apparatus including a control unit that controls an optical member by using a parameter, an image sensing unit that generates image data from an object image formed via the optical member, and a storage unit that stores, with respect to a plurality of setting values assumable by the parameter for controlling the optical member, correction information for correcting deterioration of image quality of image data that is caused by characteristics of the optical member and that is point asymmetrical with respect to an optical axis of the optical member, the correction information corresponding to a plurality of image heights at a plurality of polar angles in a polar coordinate system centered on the optical axis of the optical member, the method comprising the steps of:

when the control unit controls the optical member by using the parameter, reading correction information corresponding to a plurality of setting values that are close to a setting value of the parameter used by the control unit from the correction information stored in the storage unit;

converting a pixel position of the image data generated by the image sensing unit to polar coordinates centered on the optical axis of the optical member;

generating correction information that corresponds to the setting value of the parameter used by the control unit and the polar coordinates converted in the converting step by interpolating the correction information read in the reading step; and correcting the image data at the pixel position at the polar coordinates by using the correction information generated in the generation step, wherein the storage unit stores correction information corresponding to more polar angles in a range having a greater degree of change in the deterioration of image quality in an angular direction centered on the optical axis of the optical member.

8. An image data correction method of an image sensing apparatus, the image sensing apparatus including a control unit that controls an optical member by using a parameter, an image sensing unit that generates image data from an object image formed via the optical member, and a storage unit that stores, with respect to a plurality of setting values assumable by the parameter for controlling the optical member, correction information for correcting deterioration of image quality of image data that is caused by characteristics of the optical member and that is point asymmetrical with respect to an optical axis of the optical member, the correction information corresponding to a plurality of image heights at a plurality of polar angles in a polar coordinate system centered on the optical axis of the optical member, the method comprising the steps of:

when the control unit controls the optical member by using the parameter, reading correction information corresponding to a plurality of setting values that are close to a setting value of the parameter used by the control unit from the correction information stored in the storage unit;

converting a pixel position of the image data generated by the image sensing unit to polar coordinates centered on the optical axis of the optical member;

generating correction information that corresponds to the setting value of the parameter used by the control unit and the polar coordinates converted in the converting step by interpolating the correction information read in the reading step;

correcting the image data at the pixel position at the polar coordinates by using the correction information generated in the generation step; and detecting a feature amount for each region of the image data generated by the image sensing unit, wherein the reading step comprises reading more correction information with respect to a range having a larger feature amount detected in the feature detection step from among the correction information stored in the storage unit.

9. A non-transitory readable storage medium having stored thereon a program which is executable by an image processing apparatus, the program having a program code for realizing the image processing method according to claim 7.

10. A non-transitory readable storage medium having stored thereon a program which is executable by an image processing apparatus, the program having a program code for realizing the image processing method according to claim 8.

* * * * *